Jan. 22, 1924.

W. A. RIDDELL

PHOTOGRAPHIC SHUTTER

Filed May 25, 1923

INVENTOR.
William A. Riddell
BY
*his* ATTORNEY

Jan. 22, 1924.
W. A. RIDDELL
1,481,271
PHOTOGRAPHIC SHUTTER
Filed May 25, 1923    2 Sheets-Sheet 2
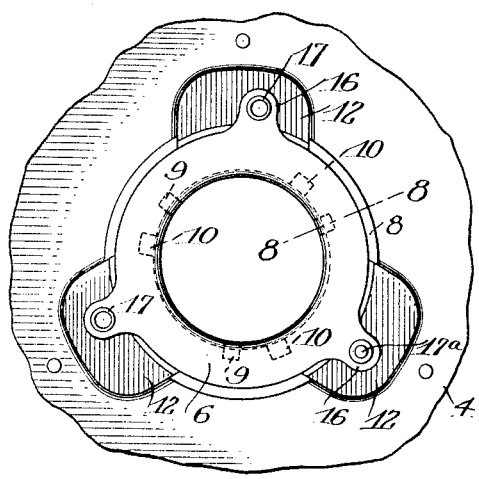
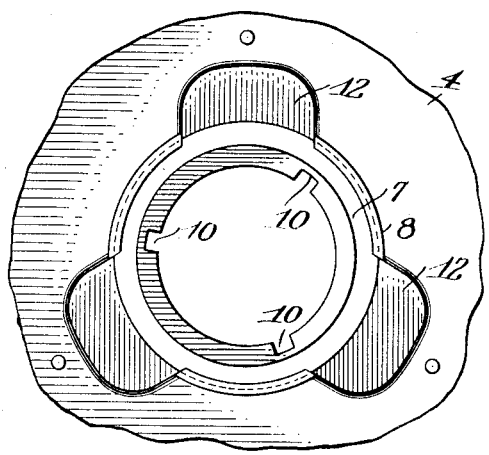
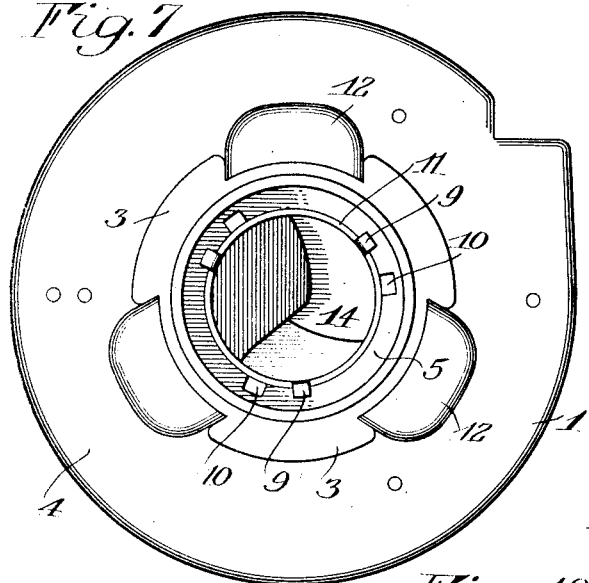
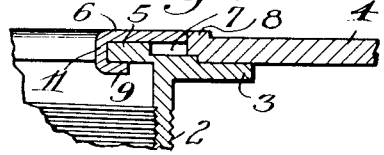
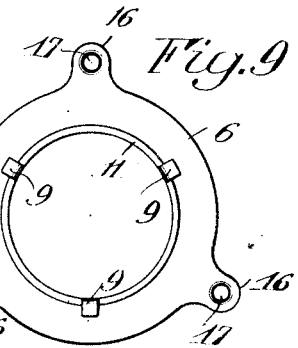
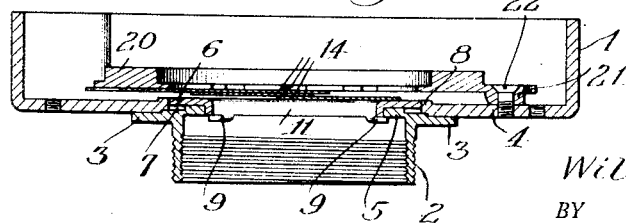
INVENTOR.
William A. Riddell
BY
his ATTORNEY Patented Jan. 22, 1924.

1,481,271

UNITED STATES PATENT OFFICE.

WILLIAM A. RIDDELL, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC SHUTTER.

Application filed May 25, 1923. Serial No. 641,384.

*To all whom it may concern:*

Be it known that I, WILLIAM A. RIDDELL, a citizen of the United States, residing at Rochester, in the county of Monroe and State of New York, have invented certain new and useful Improvements in Photographic Shutters; and I do hereby declare the following to be a full, clear, and exact description of the same, reference being had to the accompanying drawings, forming a part of this specification, and to the reference numerals marked thereon.

My present invention relates to photography and more particularly to photographic shutters of the pivoted blade symmetrical opening type and it has for its object to provide a simple and efficient blade actuating mechanism that will be light but durable and that will at the same time greatly facilitate the assembling of the shutter. To these and other ends the invention resides in certain improvements and combinations of parts all as will be hereinafter more fully described, the novel features being pointed out in the claims at the end of the specification.

In the drawings:

Figure 5 is a front view of the blade ring in place but with the blades removed.

Figure 6 is a similar view of the bottom of the shutter case with the blades and blade ring removed.

Figure 7 is a rear view of the shutter.

Figure 8 is an enlarged detail section on the line 8—8 of Figure 5.

Figure 9 is a rear view of the blade ring detached and

Figure 10 is a section through the shutter case on the line 10—10 of Figure 1.

Similar reference numerals throughout the several views indicate the same parts.

Figure 1:
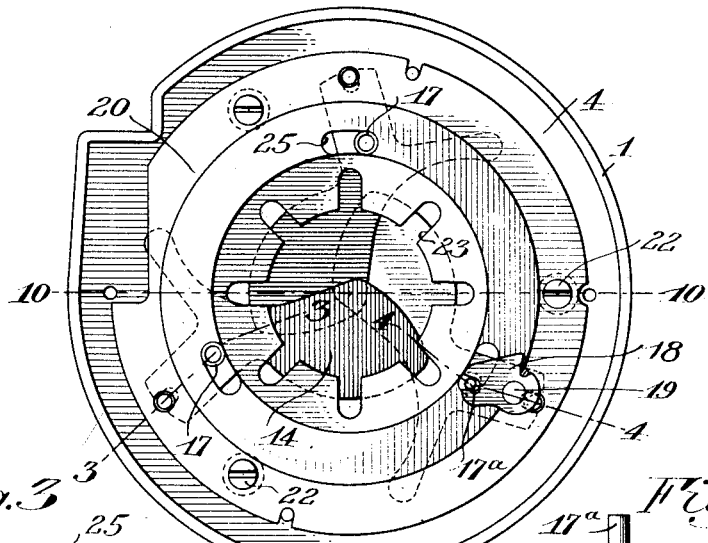
Figure 1 is a plan view of the blade mechanism of a shutter constructed in accordance with and illustrating one embodiment of my invention, the cover plate of the shutter casing being removed as well as the operating mechanism of the shutter.
Figure 3:
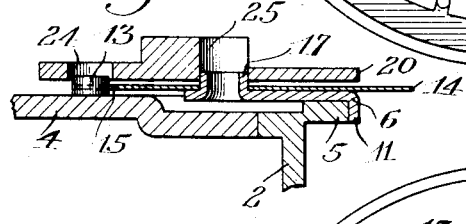
Figure 3 is an enlarged section on the line 3—3 of Figure 1.
Figure 4:
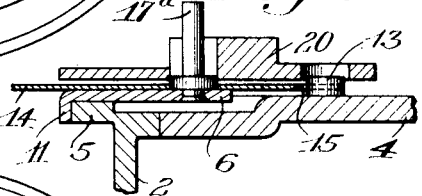
Figure 4 is an enlarged section on the line 4—4 of Figure 1.

The shutter case 1 is of the usual type although the threaded attaching collar 2 see Figure 10 is shown to be made as a separate piece having an external flange 3 bearing against the bottom 4 of the case and suitably attached thereto and an internal flange 5 forming a bearing for the blade ring as hereinafter described.

This blade ring, indicated at 6, lies on the flange 5 which is counterbored at 7 to make a better bearing and turns within the central opening 8 of the case bottom 4 being preferably flush therewith as shown in figure 10. It may consist of a light metal stamping having a rearwardly or downwardly turned central flange 11 that bears on the inner edge of the flange 5 of the attaching collar 2. This flange 11 is formed with a plurality of outwardly turned ears or lugs 9 that lock beneath the flange 5 and hold the ring to the latter. The blade ring is assembled in position by aligning the lugs 9 with and dropping them through a plurality of similarly spaced notches 10 in the flange 5 as best shown in Figures 6 and 7. When in alignment with the notches the lugs are not in normal position and therefore a partial rotation of the ring to normal position locks the parts together. The operative movement of the ring is so slight as not to carry the lugs 9 back to the notches 10 during the operation of the shutter. It will thus be seen that the ring is very easy to assemble; is smaller and lighter than the blade rings usually used and yet has a firm and free bearing on the shutter case.

Figure 2:
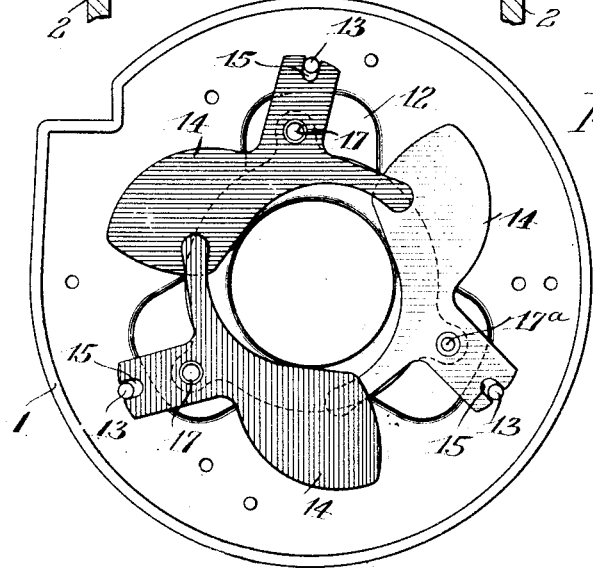
Figure 2 is a similar view of the blades with overlying parts removed.

The manner in which the blade ring actuates the blades is best shown in Figures 2 and 5. The bottom 4 of the case is provided with a plurality of recesses 12 at intervals about the opening 8 which recesses are formed in the present instance by embossing the sheet metal of which the case is formed. Adjacent to each recess is a fixed pivot pin 13 about which one of the shutter blades 14 turns on a forked bearing 15. The blades shown are of a known form and their general character is not important to this invention. The blade ring 6 is provided with a plurality of outwardly or radially projecting lugs 16 the swing of which is accommodated within the depressions 12. Suitable pivot members 17 on these lugs cooperate with bearings in the respective blades that cause the latter to swing between the open positions of Figure 2 and the closed positions of Figures 7 and 10 with the oscillations of the blade ring in the accustomed manner. One of these pivot members marked 17ª is extended upwardly higher than the rest to cooperate with an actuator 18 turning on a pivot 19 and forming part of the shutter operating mechanism not shown and immaterial to the present invention. As the actuator 18 is oscillated see Figure 1 it oscillates the blade ring 6 and so affects the blades.

The blades 14 are confined between the bottom 4 of the case and a partition member 20 that is suitably spaced by attaching lugs 21 fastened by screws 22 and provided with suitable radial slots 23 for the sliding pins of the usual type of iris diaphragm used with such shutters but not herein otherwise shown. Such plate 20 is cut away to receive the blade pivots 13 at 24 and slotted at 25 to accommodate the blade ring pivot members 17 and 17ª.

I claim as my invention:

1. In a photographic shutter, the combination with a shutter case having a lens opening therein and shutter blades fulcrumed on the case, of a blade actuating ring turning on the case within the opening and having an oscillatory operative movement, said ring being interlocked with the case by a rotary movement of greater magnitude than its operative movement.

2. In a photographic shutter, the combination with a shutter case having a lens opening therein and shutter blades fulcrumed on the case, of a blade actuating ring turning on the case within the opening and having an oscillatory operative movement, the ring and case being interlocked by relative rotary movement of greater magnitude than the operative movement of the ring and said members being respectively provided with notches and projections to effect such interlocking.

3. In a photographic shutter, the combination with a shutter case having a lens opening provided with marginal notches and shutter blades fulcrumed on the case, of a blade actuating ring having an oscillatory rotary movement in the opening and provided with interlocking lugs adapted to be inserted in or withdrawn through the notches and operating to hold the ring to the case.

4. In a photographic shutter, the combination with a shutter case having a lens opening provided with an inwardly turned flange having notches therein and shutter blades fulcrumed on the case, of a blade actuating ring having a flanged portion cooperating with the flange of the case and provided with outwardly turned lugs interlocked with the latter by being inserted through the notches and the ring then partially rotated, the ring having an oscillatory operative movement of less magnitude than its interlocking movement.

5. In a photograhpic shutter, the combination with a shutter case having a lens opening therein and shutter blades fulcrumed on the case, of a blade actuating ring turning on the case within the opening, said members being respectively provided with cooperating recesses and projections for interlocking the blade ring with the case by relative rotary movement.

WILLIAM A. RIDDELL.